United States Patent [19]

Konzorr

[11] 4,264,132
[45] Apr. 28, 1981

[54] REFLECTOR FOR BICYCLE PEDALS

[75] Inventor: Hubert Konzorr, Unna, Fed. Rep. of Germany

[73] Assignee: Union, Sils, van de Loo & Co., Fröndenberg, Fed. Rep. of Germany

[21] Appl. No.: 26,792

[22] Filed: Apr. 3, 1979

[30] Foreign Application Priority Data

Apr. 15, 1978 [DE] Fed. Rep. of Germany ... 7811383[U]

[51] Int. Cl.$^3$ .............................................. G02B 5/12
[52] U.S. Cl. .................................. 350/99; 74/594.4; 350/97
[58] Field of Search ................................. 350/97–103; 74/594.4, 813 L

[56] References Cited

U.S. PATENT DOCUMENTS 3,800,623  4/1974  Baginski .................................. 350/99
3,807,255  4/1974  Baginski .................................. 74/594.4

*Primary Examiner*—John K. Corbin
*Assistant Examiner*—B. W. de los Reyes
*Attorney, Agent, or Firm*—Max Fogiel

[57] ABSTRACT

A reflector for bicycle pedals with a holding frame and locating contours for fastening the reflector to the pedal. The holding frame receives a reflector lens of light-transmitting material, with a rear-side reflection surface protected against dirt and moisture by a mask. The mask is made an integral part of the holding frame and the reflector lens is permanently joined to the holding frame. The mask on the rear-side of the reflector lens may be a bottom plate closing the holding frame on the rear. The reflector lens may have a rim flange enclosing the reflector surface and projecting rearwards and joined permanently to the bottom plate by gluing and fusing. Locating contours in the form of holding lugs extend in the region of the holding frame on the bottom plate side away from the holding frame. Separating slots are located between the bottom plate and the holding lugs and between the holding lugs and the peripheral holding frame, with the lugs being spring lugs and part of the holding frame located on its narrow sides.

2 Claims, 6 Drawing Figures

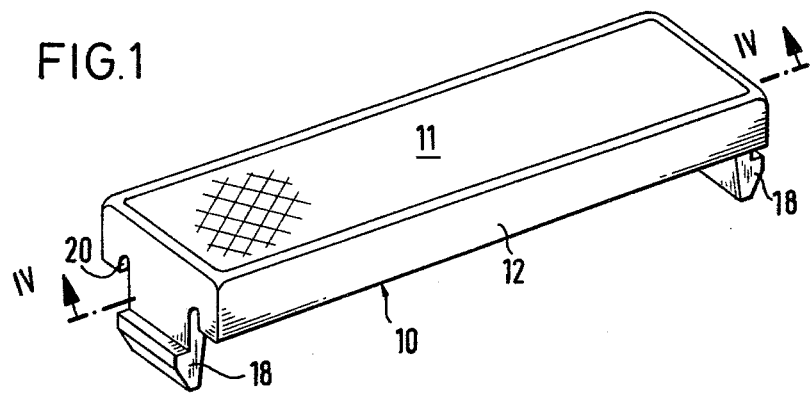
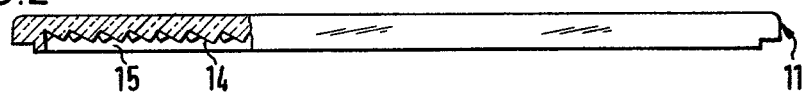
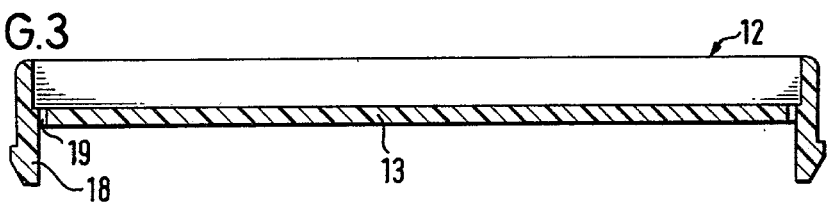
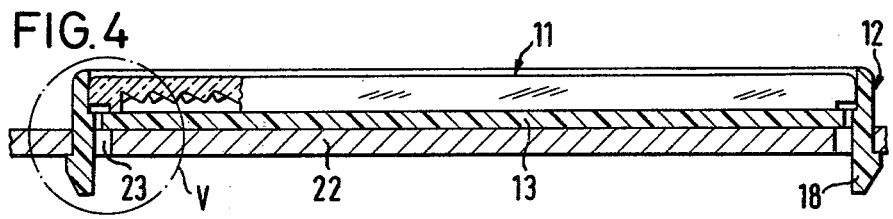
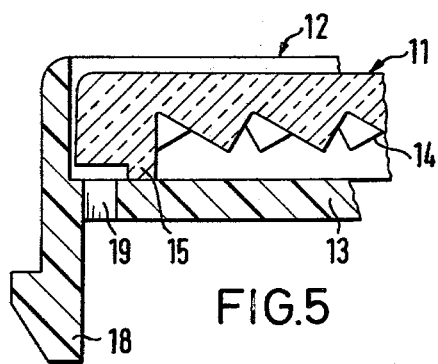
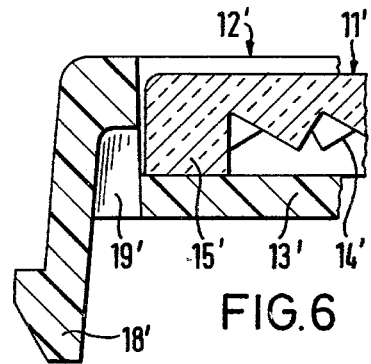

REFLECTOR FOR BICYCLE PEDALS

BACKGROUND OF THE INVENTION

The present invention relates to a reflector for bicycle pedals where a holding frame equipped with locating contours for fastening the reflector to the pedal receives and encloses a reflector lens of light-transmitting material with a rear-side reflecting area protected by a cover mask against entry of dirt and moisture.

There are known in the art reflectors for bicycle pedals consisting of a holding frame and a reflector lens with a rear masking of the reflecting surface for protection against dirt and moisture. The holding frame has locating contours incorporated in one piece which during assembly are inserted into corresponding recesses in the pedal frame and snap into the holding position when assembled where holding lugs of the locating contours reach behind the rims of the recesses in the pedal frame.

The known reflectors appear to be unsatisfactory since during manufacture the reflector lenses of light-transmitting material must be equipped, particularly fused, on the rearside with a mask protecting the reflecting surface, in the form of a heavy aluminum foil or a plastic, and then the masked reflector lenses must be assembled in the holding frames. In view of this time-intensive production method the known reflectors are expensive.

Accordingly, it is an object of the present invention to provide an improved, inexpensively produced reflector for bicycle pedals. The invention is to provide a reflector which is simple in construction and may be economically fabricated.

SUMMARY OF THE INVENTION

These objects of the present invention are achieved by a reflector of the type described by the one-piece construction of the rear mask of the reflecting surface of the reflector lens with the holding frame and by permanently joining the reflector lens liquid-tight and dust-tight with this mask directly to the holding frame.

The present invention involves making the mask, which with the present state of the art is assembled separately and connected to the reflector lens, in one piece with the holding frame and to combine reflector lens and holding frame permanently, for example, by fixing the reflector lens in the holding frame by gluing or fusing.

In a preferred embodiment, the mask of the reflecting area connected to the rear-side of the reflector lens is a bottom plate enclosing the holding frame in the rear. Another improvement provides fixedly joining this bottom plate to a rim flange of the reflector lens; this flange encloses the reflecting surface and projects beyond it in the rear; this joining may involve gluing or fusing.

Hence this embodiment of the present invention involves a reflector where a holding frame having locating contours for fastening the reflector to the pedal frame receives a reflector lens whose rear-side is a reflecting surface and has a peripheral rim flange protruding beyond the rear surface and a mask connected to this rim flange as protection against the entry of moisture and dirt. The peripheral rim flange of the reflector lens is permanently joined to the bottom plate of the holding frame. The previous requirement of a separate mask to be joined to the rear-side of the reflector lens in a separate operation becomes unnecessary since the joining of the rear-side mask to the reflector lens results in its assembly in the holding frame.

According to a further embodiment of the present invention, the locating contours extend in the region of the holding frame enclosing the reflector lens on the bottom plate side away from the holding frame in the form of holding lugs which are separated by slots from the bottom plate.

The novel features which are considered as characteristic for the invention are set forth in particular in the appended claims. The invention itself, however, both as to its construction and its method operation, together with additional objects and advantages thereof, will be best understood from the following description of specific embodiments when read in connection with the accompanying drawings.

BRIEF DESCRIPTION OF THE DRAWINGS

FIG. 1 shows a perspective view of the reflector lens, viewed obliquely from the top;

FIG. 2 shows a half-section taken along line IV—IV in FIG. 1 of the reflector lens by itself;

FIG. 3 shows a section taken along line IV—IV in FIG. 1 of only the holding frame equipped with a bottom plate;

FIG. 4 shows a section taken along line IV—IV of the complete reflector in its assembled position on a pedal frame;

FIG. 5 shows an enlarged view of detail V in FIG. 4, omitting the pedal frame; and FIG. 6 an alternative embodiment of detail V in FIG. 4.

DESCRIPTION OF THE PREFERRED EMBODIMENTS

With the reflector 10 shown in FIG. 1, the holding frame 12 receiving the reflector lens 11 is equipped with a bottom plate 13 in a one-piece construction. The reflector lens 11 consists of light-transmitting material on its rear-side has a reflector surface 14 consisting of prisms arranged in a known manner and enclosed by a rim flange 15 projecting beyond this reflector surface. As shown in FIG. 4, the face side of this rim flange contacts the bottom plate 13 closing the holding frame 13 on the rear-side and is joined to this bottom plate in a suitable manner both liquid-tight and dust-proof, for example, by fusing. In this assembled position, the holding frame which is adapted to the rectangular shape of the reflector lens, encloses the reflector lens along its outside edges and projects slightly beyond the viewing side of the reflector lens.

On the short sides of the holding frame, holding lugs 18 extend rearwards; they are spring lugs and are connected to the bottom plate 13 only indirectly, via the short sections of the holding frame, as indicated by cutouts 19 in the area of the bottom plate and 20 in the area of the narrow side edges of the holding frame. Accordingly the spring lugs can pass without impediment through the bottom plate 13 which imparts stiffness to the holding frame to such an extent that during the assembly of the entire reflector element on frame 22 of a bicycle pedal (not shown) they can be passed through the mounting holes 23 in the pedal frame, and can snap into the holding position as soon as the correct assembly position is reached, as a result of their springy character.

In the embodiment shown in FIG. 6, parts identical with those in other figures have the same reference numeral, but are marked with a prime sign ('). Also in this embodiment, the holding frame 12' is constructed with a bottom plate 13' in one piece. A flange 15' which encloses the reflector surface 14' and projects beyond it is permanently connected to this bottom plate in the manner described above. In constract with the embodiment of FIG. 5, the holding lugs 18' are separated from the bottom plate 13' by a slot 19' extending across the width of the holding lugs, but are arranged to diverge slightly from each other so that during assembly on the pedal frame, these holding lugs upon insertion into the mounting holes 23 experience a larger deformation and hence after detenting in their holding position hold the reflector under a predetermined pre-tension to the pedal frame.

Without further analysis, the foregoing will so fully reveal the gist of the present invention that others can, by applying current knowledge, readily adapt it for various applications without omitting features that, form the standpoint of prior art, fairly constitute essential characteristics of the generic or specific aspects of this invention, and therefore, such adaptations should and are intended to be comprehended within the meaning and range of equivalence of the following claims.

What is claimed is:

1. A reflector for bicycle pedals comprising: a holding frame having a base plate and locating contours for fastening said reflector to said bicycle pedal; a reflector lens of light-transmitting material received in said holding frame; said reflector lens having a rear-side reflection surface; a peripheral rim flange projecting over said reflective surface on the rear side; said holding frame receiving said reflector lens, said peripheral rim flange being connected dust-tight and liquid-proof to said base plate; said locating contours comprising holding lugs extending in region of edges of said reflector lens on a side of said base plate spaced therefrom, separating slots between said base plate and said holding lugs, and between said holding lugs and said holding frame, said lugs extending out of said holding frame on the narrow side thereof, said holding lugs comprising spring lugs which are part of said holding frame and are located on narrow sides of said holding frame, said locating contours fitting into corresponding recesses in the pedal and gripping edges of the recess from behind for positive locking.

2. A reflector as defined in claim 1, wherein said rim flange contacting said bottom plate closing said holding frame on the rear side is joined to said bottom plate by fusing, said holding frame enclosing the reflector lens along its outside edges and projecting beyond the viewing side of said reflector lens, said holding lugs extending rearwards and being connected to said bottom plate through substantially short sections of said holding frame, said spring lugs passing directly through said bottom plate for imparting stiffness to said holding frame so that said lugs can be passed through mounting holes in the pedal frame and can be snapped into a holding position.

* * * * *